United States Patent
de Andrade et al.

(10) Patent No.: US 8,220,018 B2
(45) Date of Patent: Jul. 10, 2012

(54) SYSTEM AND METHOD FOR PREFERRED PLACEMENT PROGRAMMING OF ITV CONTENT

(75) Inventors: David de Andrade, San Anselmo, CA (US); John Carney, Corte Madera, CA (US); Samuel Moreau, Mill Valley, CA (US); Tyson Singer, San Anselmo, CA (US); Srikanth Ganapavarapu, San Leandro, CA (US)

(73) Assignee: Tvworks, LLC, Philadelphia, PA (US)

( * ) Notice: Subject to any disclaimer, the term of this patent is extended or adjusted under 35 U.S.C. 154(b) by 1912 days.

(21) Appl. No.: 10/933,845

(22) Filed: Sep. 2, 2004

(65) Prior Publication Data
US 2005/0188402 A1    Aug. 25, 2005

Related U.S. Application Data

(63) Continuation-in-part of application No. 10/630,815, filed on Jul. 29, 2003, and a continuation-in-part of application No. 10/390,064, filed on Mar. 14, 2003, and a continuation-in-part of application No. 10/247,901, filed on Sep. 19, 2002, and a continuation-in-part of application No. 10/460,950, filed on Jun. 12, 2003.

(60) Provisional application No. 60/499,793, filed on Sep. 2, 2003.

(51) Int. Cl.
*H04N 7/10* (2006.01)
*G06F 3/00* (2006.01)

(52) U.S. Cl. ............................................. 725/32; 725/42
(58) Field of Classification Search .................... 725/34, 725/35, 32, 42
See application file for complete search history.

(56) References Cited

U.S. PATENT DOCUMENTS

| | | |
|---|---|---|
| 5,287,489 A | 2/1994 | Nimmo et al. |
| 5,321,750 A | 6/1994 | Nadan |
| 5,485,221 A | 1/1996 | Banker |
| 5,583,563 A | 12/1996 | Wanderscheid et al. |
| 5,613,057 A | 3/1997 | Caravel |
| 5,657,072 A | 8/1997 | Aristides et al. |

(Continued)

FOREIGN PATENT DOCUMENTS

EP    0624039 A2    11/1994

(Continued)

OTHER PUBLICATIONS

Sylvain Devillers, "Bitstream Syntax Definition Language: an Input to MPEG-21 Content Representation", Mar. 2001, ISO, ISO/IEC JTC1/SC29/WG11MPEG01/M7053.

(Continued)

*Primary Examiner* — Joseph P Hirl
*Assistant Examiner* — Hyun Hong
(74) *Attorney, Agent, or Firm* — Banner & Witcoff, Ltd.

(57) ABSTRACT

Preferred placement of programming content is provided by a system and method to organize or sequence the display of a set of programmable content elements of an iTV application to a viewer, using business rules that describe the preferred placement conditions or criteria. Such criteria include brand, content owner, application location, current channel, current channel family, current channel category, time of day, content category, current program, current program genre, current iTV application, current content type, and/or subscriber and set-top box profile and behavior data. In one implementation, the present invention allows for managing the 'shelf space' within and for iTV applications.

26 Claims, 11 Drawing Sheets

U.S. PATENT DOCUMENTS

| | | | |
|---|---|---|---|
| 5,659,793 A | 8/1997 | Escobar et al. | |
| 5,666,645 A | 9/1997 | Thomas et al. | |
| 5,675,752 A | 10/1997 | Scott et al. | |
| 5,694,176 A | 12/1997 | Bruette | |
| 5,826,102 A | 10/1998 | Escobar | |
| 5,844,620 A | 12/1998 | Coleman et al. | |
| 5,850,218 A | 12/1998 | LaJoie et al. | |
| 5,852,435 A | 12/1998 | Vigneaux | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt | |
| 5,929,849 A | 7/1999 | Kikinis | |
| 5,990,890 A | 11/1999 | Etheredge | |
| 5,996,025 A | 11/1999 | Day et al. | |
| 6,002,394 A | 12/1999 | Schein et al. | |
| 6,005,561 A | 12/1999 | Hawkins et al. | |
| 6,008,803 A | 12/1999 | Rowe | |
| 6,008,836 A | 12/1999 | Bruck et al. | |
| 6,025,837 A | 2/2000 | Matthews, III et al. | |
| 6,049,823 A | 4/2000 | Hwang | |
| 6,067,108 A | 5/2000 | Yokote et al. | |
| 6,088,722 A | 7/2000 | Herz et al. | |
| 6,141,003 A | 10/2000 | Chor et al. | |
| 6,148,081 A | 11/2000 | Szymanski et al. | |
| 6,169,543 B1 | 1/2001 | Wehmeyer | |
| 6,172,677 B1 | 1/2001 | Stautner et al. | |
| 6,177,931 B1 | 1/2001 | Alexander et al. | |
| 6,191,781 B1 | 2/2001 | Chaney et al. | |
| 6,205,582 B1 | 3/2001 | Hoarty | |
| 6,219,839 B1 | 4/2001 | Sampsell | |
| 6,240,555 B1 | 5/2001 | Shoff | |
| 6,292,827 B1 | 9/2001 | Raz | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 | 7/2002 | Kamen | |
| 6,426,779 B1 | 7/2002 | Noguchi et al. | |
| 6,442,755 B1 | 8/2002 | Lemmons | |
| 6,477,705 B1 | 11/2002 | Yuen et al. | |
| 6,486,920 B2 | 11/2002 | Arai et al. | |
| 6,522,342 B1 | 2/2003 | Gagnon et al. | |
| 6,529,950 B1 | 3/2003 | Lumelsky et al. | |
| 6,532,589 B1 | 3/2003 | Proehl et al. | |
| 6,564,263 B1 | 5/2003 | Bergman et al. | |
| 6,571,392 B1 | 5/2003 | Zigmond et al. | |
| 6,591,292 B1 | 7/2003 | Morrison et al. | |
| 6,678,891 B1 | 1/2004 | Wilcox et al. | |
| 6,684,400 B1 | 1/2004 | Goode et al. | |
| 6,760,043 B2 | 7/2004 | Markel | |
| 6,763,522 B1 | 7/2004 | Kondo | |
| 6,766,526 B1 | 7/2004 | Ellis | |
| 6,806,887 B2 | 10/2004 | Chernock et al. | |
| 6,910,191 B2 | 6/2005 | Segerberg et al. | |
| 7,028,327 B1 | 4/2006 | Dougherty et al. | |
| 7,065,785 B1 | 6/2006 | Shaffer et al. | |
| 7,103,904 B1 | 9/2006 | Blackketter et al. | |
| 7,114,170 B2 | 9/2006 | Harris | |
| 7,152,236 B1 | 12/2006 | Wugofski et al. | |
| 7,162,694 B2 | 1/2007 | Venolia | |
| 7,162,697 B2 | 1/2007 | Markel | |
| 7,197,715 B1 | 3/2007 | Valeria | |
| 7,207,057 B1 | 4/2007 | Ross | |
| 7,213,005 B2 | 5/2007 | Mourad et al. | |
| 7,221,801 B2 | 5/2007 | Jang et al. | |
| 7,305,696 B2 | 12/2007 | Thomas et al. | |
| 7,337,457 B2 | 2/2008 | Pack | |
| 7,363,612 B2 | 4/2008 | Satuloori | |
| 7,440,967 B2 | 10/2008 | Chidlovskii | |
| 7,464,344 B1 | 12/2008 | Carmichael et al. | |
| 7,516,468 B1 | 4/2009 | Deller | |
| 7,587,415 B2 | 9/2009 | Gaurav et al. | |
| 7,640,487 B2 | 12/2009 | Amielh-Caprioglio et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 2001/0014206 A1 | 8/2001 | Artigalas et al. | |
| 2001/0056573 A1* | 12/2001 | Kovac et al. | 725/32 |
| 2002/0010928 A1 | 1/2002 | Sahota | |
| 2002/0016969 A1 | 2/2002 | Kimble | |
| 2002/0023270 A1 | 2/2002 | Thomas et al. | |
| 2002/0041104 A1 | 4/2002 | Graf et al. | |
| 2002/0042915 A1 | 4/2002 | Kubischta et al. | |
| 2002/0059586 A1 | 5/2002 | Carney et al. | |
| 2002/0059629 A1 | 5/2002 | Markel | |
| 2002/0078444 A1 | 6/2002 | Krewin | |
| 2002/0083450 A1 | 6/2002 | Kamen et al. | |
| 2002/0100041 A1* | 7/2002 | Rosenberg et al. | 725/32 |
| 2002/0108122 A1 | 8/2002 | Alao et al. | |
| 2002/0124254 A1 | 9/2002 | Kikinis | |
| 2002/0144269 A1 | 10/2002 | Connelly | |
| 2002/0144273 A1 | 10/2002 | Reto | |
| 2002/0147645 A1 | 10/2002 | Alao et al. | |
| 2002/0152477 A1 | 10/2002 | Goodman et al. | |
| 2002/0156839 A1 | 10/2002 | Peterson et al. | |
| 2002/0169885 A1 | 11/2002 | Alao et al. | |
| 2002/0170059 A1 | 11/2002 | Hoang | |
| 2002/0184629 A1 | 12/2002 | Sie et al. | |
| 2002/0199190 A1 | 12/2002 | Su | |
| 2003/0001880 A1 | 1/2003 | Holtz et al. | |
| 2003/0014752 A1 | 1/2003 | Zaslavsky et al. | |
| 2003/0014753 A1 | 1/2003 | Beach et al. | |
| 2003/0023970 A1 | 1/2003 | Panabaker | |
| 2003/0025832 A1 | 2/2003 | Swart | |
| 2003/0028873 A1 | 2/2003 | Lemmons | |
| 2003/0041104 A1 | 2/2003 | Wingard et al. | |
| 2003/0051246 A1 | 3/2003 | Wilder et al. | |
| 2003/0056216 A1 | 3/2003 | Wugofski et al. | |
| 2003/0056218 A1 | 3/2003 | Wingard et al. | |
| 2003/0066081 A1 | 4/2003 | Barone, Jr. et al. | |
| 2003/0067554 A1* | 4/2003 | Klarfeld et al. | 348/461 |
| 2003/0070170 A1 | 4/2003 | Lennon | |
| 2003/0084444 A1 | 5/2003 | Ullman | |
| 2003/0084449 A1* | 5/2003 | Chane et al. | 725/46 |
| 2003/0086694 A1 | 5/2003 | Davidsson | |
| 2003/0093790 A1 | 5/2003 | Logan et al. | |
| 2003/0093792 A1 | 5/2003 | Labeeb | |
| 2003/0097657 A1* | 5/2003 | Zhou et al. | 725/46 |
| 2003/0110503 A1 | 6/2003 | Perkes | |
| 2003/0126601 A1 | 7/2003 | Roberts et al. | |
| 2003/0132971 A1 | 7/2003 | Billmaier et al. | |
| 2003/0135464 A1 | 7/2003 | Mourad et al. | |
| 2003/0140097 A1 | 7/2003 | Schloer | |
| 2003/0151621 A1 | 8/2003 | McEvilly et al. | |
| 2003/0172370 A1 | 9/2003 | Satuloori et al. | |
| 2003/0189668 A1 | 10/2003 | Newnam et al. | |
| 2003/0204846 A1 | 10/2003 | Breen | |
| 2003/0204854 A1 | 10/2003 | Blackketter et al. | |
| 2003/0229899 A1 | 12/2003 | Thompson et al. | |
| 2004/0003402 A1* | 1/2004 | McKenna, Jr. | 725/46 |
| 2004/0019900 A1 | 1/2004 | Knightbridge et al. | |
| 2004/0039754 A1 | 2/2004 | Harple | |
| 2004/0107437 A1 | 6/2004 | Reichardt et al. | |
| 2004/0133923 A1* | 7/2004 | Watson et al. | 725/134 |
| 2004/0136698 A1* | 7/2004 | Mock | 386/123 |
| 2004/0172648 A1 | 9/2004 | Xu et al. | |
| 2004/0221306 A1 | 11/2004 | Noh | |
| 2004/0226051 A1 | 11/2004 | Carney et al. | |
| 2005/0005288 A1 | 1/2005 | Novak | |
| 2005/0149972 A1 | 7/2005 | Knudson | |
| 2005/0155063 A1 | 7/2005 | Bayrakeri et al. | |
| 2005/0283800 A1 | 12/2005 | Ellis et al. | |
| 2005/0287948 A1 | 12/2005 | Hellwagner et al. | |
| 2006/0080707 A1 | 4/2006 | Laksono | |
| 2007/0271587 A1 | 11/2007 | Rowe | |
| 2008/0060011 A1 | 3/2008 | Kelts | |
| 2008/0235725 A1 | 9/2008 | Hendricks | |
| 2008/0276278 A1 | 11/2008 | Krieger et al. | |
| 2009/0094632 A1 | 4/2009 | Newnam | |
| 2010/0223640 A1 | 9/2010 | Reichardt et al. | |
| 2010/0251284 A1 | 9/2010 | Ellis et al. | |
| 2011/0209180 A1 | 8/2011 | Ellis et al. | |

FOREIGN PATENT DOCUMENTS

| | | |
|---|---|---|
| EP | 0624039 A3 | 11/1994 |
| EP | 0963115 | 12/1999 |
| EP | 1058999 | 12/2000 |
| EP | 1080582 | 3/2001 |
| WO | 9963757 | 12/1999 |
| WO | WO00/11869 | 3/2000 |
| WO | 0033576 | 6/2000 |
| WO | 0182613 | 11/2001 |
| WO | 02063426 | 8/2002 |
| WO | 02063471 | 8/2002 |
| WO | 02063851 | 8/2002 |
| WO | 02063878 | 8/2002 |
| WO | 03009126 | 1/2003 |

OTHER PUBLICATIONS

Fernando Periera, "The MPEG-4 Book", Prentice Hall, Jul. 10, 2002.
Michael Adams, "Open Cable Architecture", Cisco Press, Dec. 3, 1999.
Mark Riehl, "XML and Perl", Sams, Oct. 16, 2002.
Office Action in U.S. Appl. No. 10/390,064 dated Nov. 8, 2010.
Office Action in U.S. Appl. No. 10/247,901 dated Oct. 13, 2010.
MetaTV, Inc., PCT/US02/29917 filed Sep. 19, 2002, International Search Report dated Apr. 14, 2003; ISA/US; 6 pages.
Andreas Kraft and Klaus Hofrichter, "An Approach for Script-Based Broadcast Application Production", Springer-Verlag Brling Heidelberg, pp. 74-82, 1999.
Office Action in U.S. Appl. No. 10/618,210 dated Jun. 28, 2010.
Office Action in U.S. Appl. No. 11/381,508 dated Mar. 16, 2010.
Office Action in U.S. Appl. No. 10/390,064 dated Apr. 12, 2010.
Office Action in U.S. Appl. No. 10/630,815 dated Apr. 13, 2010.
Office Action in U.S. Appl. No. 10/672,983 dated Jul. 20, 2010.
Office Action in U.S. Appl. No. 10/618,210 dated Jan. 21, 2010.
Office Action in U.S. Appl. No. 10/630,815 dated Jul. 9, 2008.
Office Action in U.S. Appl. No. 10/390,064 dated Jan. 25, 2008.
Shih, et al., "A SMIL Based Graphical Interface for Interactive TV", Internet Tech. Laboratory Dept. of Comp. Engineering, San Jose State University, pp. 257-266.
Office Action in U.S. Appl. No. 10/390,064 dated Sep. 4, 2008.
Office Action in U.S. Appl. No. 10/390,064 dated Oct. 27, 2009.
Office Action in U.S. Appl. No. 10/390,064 dated May 13, 2009.
Office Action in U.S. Appl. No. 10/247,901 dated Apr. 9, 2010.
Office Action in U.S. Appl. No. 10/618,210 dated Jan. 25, 2011.
Office Action in U.S. Appl. No. 10/618,210 dated Nov. 21, 2008.
Office Action in U.S. Appl. No. 10/618,210 dated Jun. 8, 2009.
Office Action in U.S. Appl. No. 10/618,210 dated Jun. 6, 2008.
Office Action in U.S. Appl. No. 10/672,983 dated Mar. 30, 2011.
Office Action in U.S. Appl. No. 10/672,983 dated Dec. 8, 2009.
Office Action in U.S. Appl. No. 10/672,983 dated Jan. 13, 2009.
Office Action in U.S. Appl. No. 10/672,983 dated Jun. 12, 2008.
Office Action in U.S. Appl. No. 10/672,983 dated Jun. 29, 2009.
Office Action in U.S. Appl. No. 10/630,815 dated Apr. 21, 2011.
Office Action in U.S. Appl. No. 10/630,815 dated Oct. 5, 2009.
Office Action in U.S. Appl. No. 10/630,815 dated Dec. 24, 2008.
Office Action in U.S. Appl. No. 10/630,815 dated Nov. 28, 2007.
Office Action in U.S. Appl. No. 10/618,210 dated Jul. 11, 2011.
Office Action in U.S. Appl. No. 10/247,901, dated Aug. 11, 2011.
Office Action in U.S. Appl. No. 10/618,210, dated Oct. 4, 2007.
Office Action in U.S. Appl. No. 10/894,740, dated Mar. 10, 2011.
Office Action in U.S. Appl. No. 10/894,740, dated Jul. 7, 2011.
Office Action in U.S. Appl. No. 10/894,740, dated Oct. 14, 2010.
Office Action in U.S. Appl. No. 10/672,983 dated Oct. 25, 2011.
Office Action in U.S. Appl. No. 12/730,771 dated Oct. 5, 2010.
Yoon, et al., "Video Gadget: MPET-7 Based Audio-Visual Content Indexing and Browsing Engine", LG Electronics Institute of Technology, pp. 59-68.
U.S. Appl. No. 10/460,950, filed Jun. 12, 2003.
Office Action in U.S. Appl. No. 10/925,737 dated Feb. 9, 2011.
Office Action in U.S. Appl. No. 09/841,149 dated Nov. 8, 2010.

* cited by examiner

44

46

48

54

SYSTEM AND METHOD FOR PREFERRED PLACEMENT PROGRAMMING OF ITV CONTENT

RELATED APPLICATIONS

The present application is related to, incorporates by reference and claims the priority benefit of U.S. Provisional Patent Application 60/499,793, entitled "System and Method for Preferred Placement Programming of iTV Content", filed Sep. 2, 2003. The present application is also a Continuation-in-Part, claims the priority benefit of and incorporates by reference the following U.S. Patent Applications, each assigned to the assignee of the present application:
1. application Ser. No. 10/390,064, filed Mar. 14, 2003, entitled "System and Method for Construction, Delivery and Display of iTV Content";
2. application Ser. No. 10/247,901, filed Sep. 19, 2002, entitled "Interactive User Interface for Television Applications";
3. application Ser. No. 10/460,950, filed Jun. 12, 2003, entitled "Graphically Rich, Modular, Promotional Tile Interface for Interactive Television"; and
4. application Ser. No. 10/630,815 filed Jul. 29, 2003, entitled "System and Method for Construction, Delivery and Display of iTV Content".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to systems and methods for enabling and automating the delivery of interactive television (iTV) content to subscribers (viewers).

BACKGROUND

The above-cited patent applications individually demonstrate aspects of a system that provides for control of programming of content, including ads and promotions and other content, within an iTV system. The present invention is intended to illustrate a system and method that provides for programming content from the business perspective of 'pay for placement' or 'shelf space' within a framework of iTV applications.

SUMMARY OF THE INVENTION

In one embodiment, a set of programmable content elements of an interactive television (iTV) application are organized using business rules that describe preferred placement criteria of the programmable content elements. Once so organized, the content elements may be viewed, for example in conjunction with a user interface for the iTV application. The business rules may include rules for placing one or more of: product offerings, promotions, advertising campaigns, video on demand (VOD) listings, broadcast-on-demand listings, or transactional opportunities, across disparate iTV services. In some embodiment, the rules for placing product offerings are configured to accommodate multiple selection criteria including one or more of: location, current channel, current channel family, current channel category, time of day, offering category, current program, current program genre, current iTV application, current content type, or subscriber profile.

Alternatively, or in addition, the business rules may be configured to accommodate subscriber specific rules according to a subscriber profile associated with a particular client device. The business rules may be selected dynamically at the time of execution of the iTV application, or at the time of application creation.

In some embodiments, the preferred placement criteria include one or more of: brand, content owner, application location, current channel, current channel family, current channel category, time of day, content category, current program, current program genre, current iTV application, current content type, or subscriber and set-top box profile and behavior data. The programmable content elements may include one or more of: advertising, promotions, content placement packages or programming campaign definitions.

Each programmable element may be identified by a resource key attribute that references an associated programming campaign. Such a programming campaign may specify programming of associated content elements and includes a campaign key that uniquely identifies the programming campaign, a list of candidates each providing a set of programmed values for attributes of the associated content elements, a qualifying predicate for each candidate that includes a generalized set of conditions, and a display rule to select one candidate among those that qualify.

Generally then, the iTV application is accessible via a user interface that includes one or more groups of programmable opportunities. Each programmable opportunity may include a location within the iTV application where content may be placed. The content may include one or more of: advertisements, promotions, data including text, images, links to other applications, or audio/video content.

In a further embodiment, an iTV system includes a server configured to organize a set of programmable content elements of an iTV application using business rules that describe preferred placement criteria of the programmable content elements; and a client communicatively coupled to the server via a content distribution network and which is configured to display the content elements so organized to a viewer. The server may include (i) a programming manager configured to allow placement of advertising, promotional opportunities, video, images and text within user interfaces accessible by the viewer through the client; and (ii) a programming manager configured to program the content elements according to: a campaign key that uniquely identifies a programming campaign, a list of candidate content elements each providing a set of values for attributes of associated ones of the content element, a qualifying predicate for each candidate content element that consists of a generalized set of conditions, and a display rule to select one of the candidates among those that qualify.

The business rules are preferably adapted to accommodate one or more of: location, current channel, current channel family, current channel category, time-of-day, offering category, current program, current program genre, current application, current content type, or subscriber profile; and determine which of the content elements are shown via a user interface and when, and in what order and sequence the content elements should be displayed. In one particular embodiment, the business rules are described in XML format.

Generally, the business rules define preferred placements of the content elements based on one or more of the following criteria: time of day, current channel, current broadcast content, viewer demographic, viewer behavior, navigation context or current content category; and may be regarded as rules associated with one or more of the following categories: advertising and promotional rules; TV channel association rules; timing rules for rotation of content, ads, and promotions; category placement rules; VOD metadata rules; or self provisioning rules.

A further embodiment provides for describing programmable conditions for placement of content within an iTV application along multiple dimensions according to business rules that include sets of content programming rules that support creation of user interfaces within which the content is displayed. The content programming rules may include rules for time shifting so as to present different content selections to viewers based on time of day; rules adapted to permit different content selections to be presented based on current broadcast content; rules adapted to dynamically control content within tiled user interfaces; rules adapted to control placement of tiles within tiled user interfaces; rules adapted to permit groupings of ties within tiled user interfaces; and/or rules adapted to permit dynamically controlled transitions between tile groupings within tiled user interfaces. The content programming may be conditioned by dynamically executing the business rules, which may be conditioned by various parameters including: current application, application type, location, time-of-day, day part, current channel, current network family, current channel category, current program, current program genre, current program attributes, current content type, or application data. The business rules may be defined to target subscriber profile attributes including: demographics, service tier, geography, or subscriber behavior.

DETAILED DESCRIPTION

Figure 1:
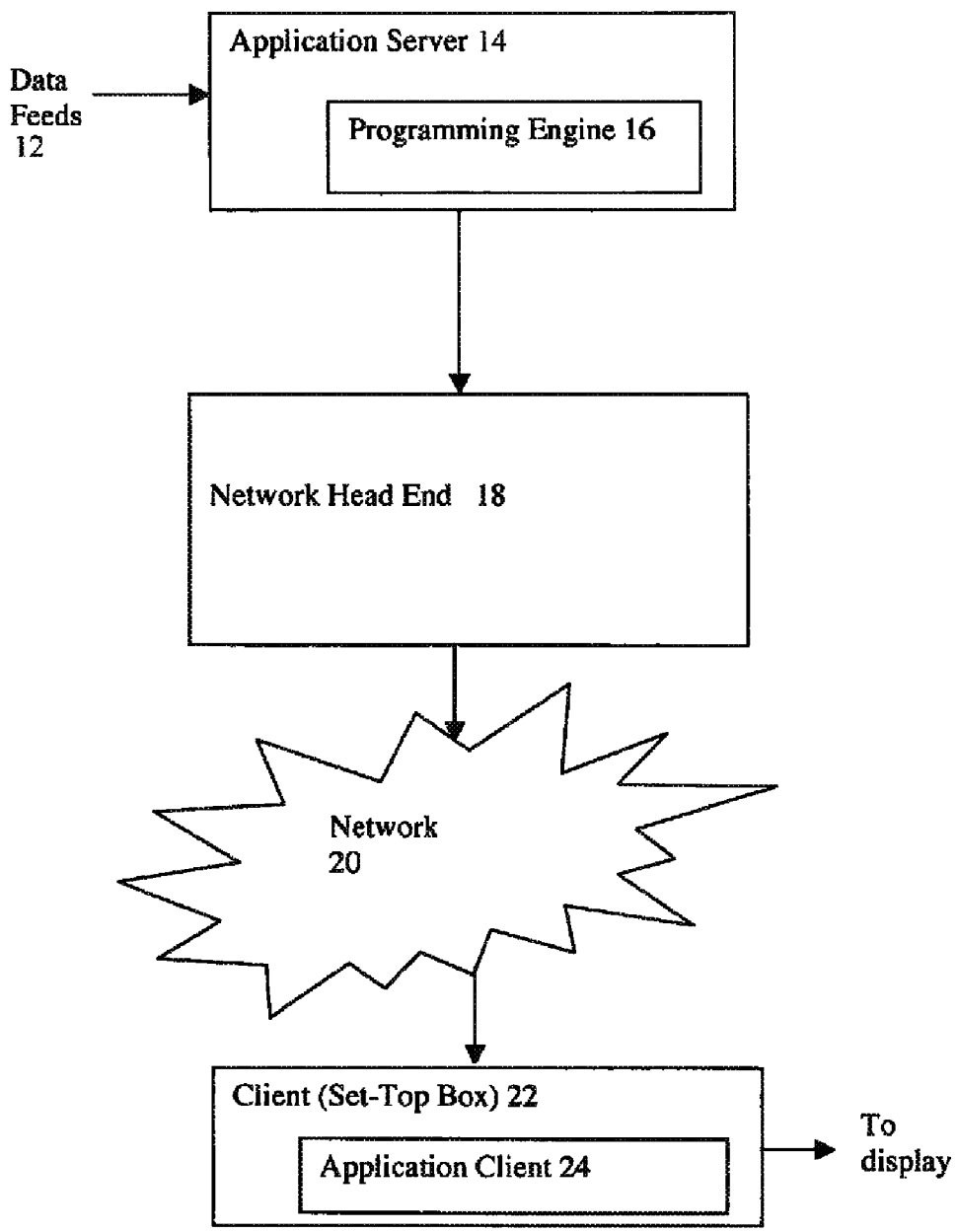
FIG. 1 illustrates one example of a unified application system (UAS) configured in accordance with an embodiment of the present invention.

Described herein are methods and systems for providing preferred placement of programming content within an iTV system. Various embodiments of the present invention provide for organizing or sequencing the display of a set of programmable content elements to a viewer using business rules that describe preferred placement conditions or criteria. Such criteria may include some or all of: brand, content owner, application location, current channel, current channel family, current channel category, time of day, content category, current program, current program genre, current iTV application, current content type, and/or subscriber and set-top box profile and behavior data. In one implementation, the present invention allows for managing the 'shelf space' within and for iTV applications.

Within the present system, a server component presents a view of the programmable opportunities for automated control and management of individual programming opportunities or groups of programming opportunities. These programming opportunities can take the shape of lists, positioning within lists, groups of tiles, positioning of graphical elements, elements of a content ticker, or other representation methods for a multiplicity of content elements related via a programmed display or interaction sequence. The system operator (MSO), network programmer or content application owner may control different sets of these programmable opportunities. A single screen (e.g., for presentation to a television viewer) may display one or more groups of programmable opportunities.

The above-cited U.S. patent application Ser. No. 10/390,064 (the "'064 application") describes a framework for iTV applications that accommodates a system and method for management and delivery of programmable content, that may include advertising, promotions, content placement packages and/or programming campaign definitions, so as to permit a selection of a specific advertisement, promotion or content at a time of preparation of the iTV content by the server component, and/or a time of execution of the iTV applications by the client component. In the framework described in the '064 application, the iTV applications are tagged in a manner such that the iTV applications present all placement opportunities across all applications as a set of programmable opportunities. In this regard, a programmable opportunity can be any location or set of locations within the iTV applications where content may be placed, said content including advertisements, promotions, data including text, images, links to other applications, and/or audio/video delivered over broadcast or narrowcast, displayed in scaled inset or overlay form. The iTV applications are configured to respond in a subscriber-specific manner to user interactions with the iTV applications.

The selection or programming of content may be made according to one or more business rules, which may include rules for placing and/or automating product offerings, promotions, advertising campaigns, VOD, broadcast-on-demand, transactional opportunities, and/or other types of content across disparate television services. The rules for placing and/or automating product offerings across disparate iTV applications may accommodate multiple selection criteria, for example: location, current channel, current channel family, current channel category, time of day, offering category, current program, current program genre, current iTV application, current content type, and subscriber profile. Further, the business rules may accommodate subscriber-specific rules according to a subscriber profile associated with a particular one of the client devices upon which the client component is resident. The business rules may be selected at any of the following instances: dynamically at the time of execution of the iTV applications, or at the time of application creation.

The above-cited U.S. patent application Ser. No. 10/247,901 (the "'901 application") describes the concept of 'preferred placement' in the context of a user interface for interactive television services in which the content pieces, advertising and promotions can be organized according to configurable business rules to dynamically control the content and preferred placement of elements of content, including tiles, within displayed categories. These business rules can be configured according to time of day, television channel, channel content, preferred placement, viewer demographic, viewer behavior, navigation context and/or content category.

The above-cited U.S. patent application Ser. No. 10/460,950 (the "'950 application") describes user interfaces for preferred placement that allow for the programming of tiles of ads, promotions or other content in a manner that permits the control of individual tiles and groups of tiles along multiple dimensions. These placement opportunities may be controlled in the many ways described above, and also may be presented to viewers in multiple forms of iTV user interfaces through the common programming mechanisms.

Thus, the above-cited patent applications demonstrate aspects of a system that provides for controling programming of content within an iTV system. In the present invention these elements are combined to provide a system and method that provides for programming content from the business perspective of 'pay for placement' or 'shelf space' within a framework of iTV applications.

FIG. 1 illustrates one embodiment of an end-to-end environment 10 for developing, delivering and deploying iTV applications. In this illustration, data feeds 12 are provided to an application server 14 configured to produce iTV application for distribution via headend 18 and network 20. These applications along with other content are received at set-top box 22, which provides output signals to a display devices (e.g., a television set) for presentation to a viewer. Programming rules engine 16 of application server (AS) 14 provides the ability for a network operator, programmer, or content producer to specify rules and conditions to dynamically place and target content to subscribers, and respond to user interaction in different ways; and wherein elements of the programmed content, such as promotions, requests for information, placement opportunities and other elements can be programmed and scheduled across various services. Automated placement and targeting of offerings, promotions, commerce opportunities and content in a unified manner across all iTV services, according to multiple selection rules such as location, current channel, current channel family, current channel category, time-of-day, offering category, current program, current program genre, current application, current content type, and subscriber profile is also provided for.

A programming campaign specifies the programming of a content element and consists of four main components:
1. A campaign key that uniquely identifies the campaign.
2. A list of candidates each providing a set of programmed values for the element attributes.
3. A qualifying predicate for each candidate, that consists of a generalized set of conditions.
4. A display rule, such as sequential, random or weighted, to select one candidate among those that qualify.

A programmable element is identified by the presence of a special resource key attribute that references a programming campaign; for example, via a lookup using the resource key as an index into a location list that provides the current campaign ID to use for programming the element. The application client (AC) 24 on set-top box 22 executes the campaign definition. This execution results in the selection of a qualifying candidate (e.g., by determining the truth value of the programming conditions). The selected candidate provides a resolution of one or more of the attributes and data of the programmable element, some of which may be newly specified, and some updated (e.g., from default values provided by the template and data package).

The above-described concept of programming by dynamic execution of rules is available as a mechanism to resolve properties of any content element. Wherever possible, triggering of rules execution is given the following preferential treatment (in order):
1. On AS 14 during construction of the broadcast content.
2. On AC 24 for the remaining rules where possible.
3. On AS 14 using a 2-way return path (back channel) request where required.

As further described in the above-cited patent applications, AS 14 includes a programming manager that allows a network operator, programmer or content producer to specify the elements of advertising, promotional opportunities, VOD placement, image and text placement, subscriber targeting, service and application provisioning, interactive user responses and other programming elements in the service. It allows the administrator to specify the condition predicates and dynamic associative lookups and business rules that constitute service programming.

Figure 2:
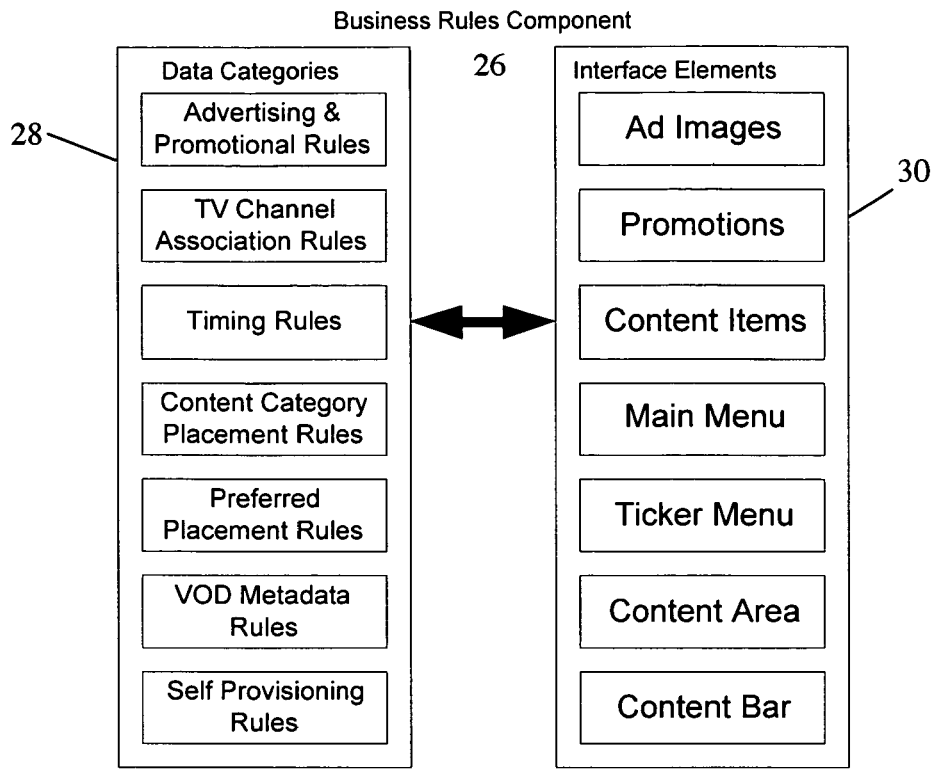
FIG. 2 illustrates an example of a business rules component configured in accordance with an embodiment of the present invention.

Turning now to FIG. 2, the business rules component 26 of AS 14 is responsible for constructing business rule objects and applying these business rules to template objects. Further information regarding template objects and their construction may be found in the above-cited patent applications. In one embodiment, business rules are described in an XML format and define placement or other objectives that may be based on criteria such as: time of day, current channel, current broadcast content, viewer demographic, viewer behavior, navigation context and/or current content category.

As shown in the illustration, the business rules themselves may, in one embodiment, comprise rules associated with various data categories 28, which include:
1 Advertising and promotional rules.
2 TV channel association rules.
3 Timing rules (e.g., for rotation of content, ads and promotions).
4 Category placement rules.
5 Preferred placement rules.
6 VOD metadata rules.
7 Self provisioning rules.

The business rules component 26 receives the business rules, interprets them, and provides constructions that will eventually be applied to layout and display objects. The business rules component 26 determines what interface elements 30 (e.g., data, images, ads, menu choices, etc.) are shown and when, and in what order and sequence those elements should be displayed. In one embodiment this may include displaying an advertisement for a sports product when the viewer is tuned to a sports channel. In another embodiment this may include providing links to a specific video when a user tuned a specific channel at a specific time.

By way of illustration only, and without limitation, the XML example provided in '064 application provides for location definition and preferred placement within programming campaign definitions:

```
<?xml version="1.0" encoding="UTF-8"?>
<meta-business-rules>
    <!-- location list identifies the campaign -->
    <location-list start="938129" end="948128">
        <location>
            <resource key="2"/>
            <campaign-schedule id="1_176_80">
                <interval start="938129" end="948128"/>
            </campaign-schedule>
        </location>
    </location-list>
<?xml version="1.0" encoding="UTF-8"?>
<!--programming campaign resolves the element attributes and data -->
<campaign-list start="938129" end="948128">
    <campaign id="1_176_80" displayrule="2">
        <element id="1_176_81" type="1" displayruledata="1"
            onclick="vod("10100011")"
src="img24135.ast" default="true">
            <condition>
                <equal name="package" value="bronze"/>
            </condition>
```

```xml
            <condition>
                <equal name="package" value="silver"/>
                <equal name="hbo" value="no"/>
            </condition>
        </element>
        <element id="1_176_82" type="1" displayruledata="2"
onclick="vod("10100012")" src="img24138.ast">
            <condition>
                <equal name="package" value="platinum"/>
            </condition>
            <condition>
                <equal name="package" value="silver"/>
                <equal name="hbo" value="yes"/>
            </condition>
        </element>
    </campaign>
</campaign-list>
</meta-business-rules>
```

In this example, the 'displayrule' attribute indicates a preferred placement rule or sequence is to be applied, and the 'displayruledata' attribute provides the sequence data for the business rules component 26 to apply the ordering for content in the presentation user interface.

As another example, and without limitation, the XML example provided below illustrates another implementation of the business rules for preferred placement within programming campaign definition:

```xml
<?xml version="1.0" encoding="UTF-8"?>
<!-- This is generated on per Application basis -->
<programming>
    <!-- programming based on location -->
    <ruleSetList>
        <!-- A ruleSet identifies a location in the application,
i.e. a group of identical programmable elements -->
        <ruleSet location="111" default="211" displayRule="firstFound">
            <rule id="311">
                <conditionRef id="1"/>
                <actionRef id="11"/>
            </rule>
            <rule id="312">
                <conditionRef id="2"/>
                <actionRef id="12"/>
            </rule>
            <!-- the rule with id marked by default attribute in the
            enclosing ruleSet -->
            <rule id="211">
                <actionRef id="21"/>
            </rule>
        </ruleSet>
        <ruleSet location="112" default="212" displayRule="sequential">
            <rule id="411">
                <conditionRef id="3"/>
                <actionRef id="13"/>
            </rule>
            <rule id="412">
                <conditionRef id="4"/>
                <actionRef id="14"/>
            </rule>
            <rule id="212">
                <actionRef id="22"/>
            </rule>
        </ruleSet>
        <ruleSet location="113" default="213" displayRule="random">
            <rule id="511">
                <conditionRef id="5"/>
                <actionRef id="15"/>
            </rule>
            <rule id="512">
                <conditionRef id="6"/>
                <actionRef id="16"/>
            </rule>
            <rule id="213">
                <actionRef id="23"/>
            </rule>
        </ruleSet>
        <ruleSet location="114" default="214" displayRule="weighted">
            <!-- A rule with no condition is always in contention for
            selection-- >
            <rule id="611">
                <actionRef id="17"/>
            </rule>
            <rule id="612">
                <conditionRef id="8"/>
                <actionRef id="18"/>
            </rule>
            <!-- a rule is treated default only when no rule is selected.
            Otherwise, a rule designated as default still pariticipates
            in race for selection and has conditions that should
            return true on test, to qualify. When acting as a
            default rule, test condition results are ignored. -->
            <rule id="214">
                <conditionRef id="7"/>
                <actionRef id="24"/>
            </rule>
        </ruleSet>
    </ruleSetList>
    <actionList>
        <action id="11">
            <image src="/pepsi/britney.jpg" type="pframe">
                <pframe key="11" x="100" y="150"/>
                <pframe key="12" x="200" y="150"/>
            </image>
            <image src="pepsi/logo.jpg" type="pframe">
                <pframe key="11" x="150" y="250"/>
                <pframe key="12" x="250" y="250"/>
            </image>
            <image src="pepsi/bottle.jpg" type="pframe">
                <pframe key="11" x="200" y="350"/>
                <pframe key="12" x="300" y="350"/>
            </image>
            <button type="vod" onclick="66">Go</button>
        </action>
        <action id="12">
            <image src="/weather.jpg" type="bitmap"/>
            <hotspot type="url" onclick="/weather/forecast.xml"/>
            <image src="/graph.jpg" type="bitmap"/>
            <hotspot type="url" onclick="/finance/headlines.xml"/>
        </action>
        <action id="14">
            <image src="/harrypotter.jpg" type="bitmap"/>
            <text>Harry Potter and the Chamber of Secrets</text>
            <hotspot type="vod" onclick="12"/>
        </action>
        <action id="15">
            <image src="/startrek.jpg" type="bitmap"/>
            <text>Star Trek: Generations</text>
            <button type="vod" onclick="48">Preview</button>
        </action>
        <!--
        <action id="16">
        </action>
        <action id="17">
        </action>
        <action id="18">
        </action>
        <action id="21">
        </action>
        <action id="22">
        </action>
        <action id="23">
        </action>
        <action id="24">
        </action>
        -->
    </actionList>
    <conditionList>
        <condition id="1">
            <and>
                <!-- current channel -->
                <test lhs="channel.name" rhs="DISN" op="eq"/>
                <!-- current program genre -->
                <test lhs="program.genre" rhs="COMEDY" op="eq"/>
```

```xml
        <!-- current program attributes -->
        <test lhs="program.length" rhs="1800" op="eq"/>
        <test lhs="system.time" rhs="229012380911" op="ge"/>
        <test lhs="system.time" rhs="229012381840" op="lt"/>
      </and>
    </condition>
    <condition id="2">
      <!-- current program -->
      <test lhs="program.name" rhs="SEINFELD" op="eq"/>
    </condition>
    <condition id="3">
      <and>
        <!-- current network family -->
        <test lhs="channel.network" rhs="ESPN" op="eq"/>
        <!-- current channel category -->
        <test lhs="channel.category" rhs="SPORTS" op="eq"/>
        <!-- current iTV content type or category -->
        <test lhs="hmenu.category" rhs="GOLF" op="eq"/>
        <test lhs="vmenu.category" rhs="ON NOW" op="eq"/>
        <!-- time of the day, or day parts etc. -->
        <test lhs="system.time" rhs="219012380919" op="ge"/>
        <test lhs="system.time" rhs="219012381838" op="lt"/>
      </and>
    </condition>
    <condition id="4">
      <or>
        <test lhs="favorites.content" rhs="ESPN" op="eq"/>
        <test lhs="last.content" rhs="ESPN" op="eq"/>
        <test lhs="last.genre" rhs="SPORTS" op="eq"/>
        <test lhs="favorites.genre" rhs="SPORTS" op="eq"/>
      </or>
    </condition>
    <condition id="5">
      <or>
        <!-- set top properties : zip code -->
        <test lhs="subscriber.zipcode" rhs="14128" op="eq"/>
        <!-- subscriber profile : service tier -->
        <test lhs="subscription.tier" rhs="SILVER" op="le"/>
      </or>
    </condition>
    <condition id="6">
      <or>
        <!-- saved set top behavior : last accessed -->
        <test lhs="last.channel" rhs="FOXM" op="eq"/>
        <test lhs="last.network" rhs="FOX" op="eq">
        <!-- saved subscriber info : favorites -->
        <test lhs="favorites.channel" rhs="FOXM" op="eq"/>
        <test lhs="favorites.network" rhs="FOX" op="eq"/>
      </or>
    </condition>
    <condition id="7">
      <or>
        <test lhs="subscriber.gender" rhs="M" op="eq"/>
        <test lhs="channel.name" rhs="MEN" op="eq"/>
      </or>
    </condition>
    <condition id="8">
      <and>
        <!-- subscriber profile : demographics -->
        <test lhs="subscriber.age" rhs="21" op="gt"/>
        <!-- current channel network -->
        <test lhs="channel.network" rhs="HBO" op="eq"/>
        <!-- application data -->
        <data name="$$billing.hbo.paid[subscriber]"
              value="TRUE" op="eq"/>
      </and>
    </condition>
  </conditionList>
  <videoList>
    <video number="12">
      <title>Harry Potter: The Chamber of Secrets</title>
      <providerId>Warner</providerId>
      <adiAssetId>1230982168092242</adiAssetId>
    </video>
    <video number="48">
      <title>Star Trek: Generations</title>
      <providerId>Paramount</providerId>
      <adiAssetId>1788752120922242</adiAssetId>
    </video>
    <video number="66">
      <title>Pepsi: Britney Singing Promotion</title>
      <providerId>Pepsi</providerId>
      <adiAssetId>1230982120922242</adiAssetId>
    </video>
  </videoList>
  <resourceKeyMap>
    <channel name="news">
      <template path="headlines.xml" resource="1"
                key="11" location="111"/>
      <template path="details.xml" included="story.xml"
                resource="1" key="12" location="112"/>
    </channel>
    <channel name="sports">
      <template path="headlines.xml" resource="1" key="21"
                location="111"/>
      <template path="details.xml" included="story.xml"
                resource="1" key="22" location="114"/>
      <template path="scores.xml" resource="1" key="23"
                location="114"/>
    </channel>
    <channel name="weather">
      <template path="headlines.xml" resource="1" key="31"
                location="111"/>
      <template path="forecast.xml" resource="1" key="32"
                location="112"/>
      <template path="maps.xml" resource="1" key="33"
                location="112"/>
    </channel>
    <channel name="finance">
      <template path="headlines.xml" resource="1" key="51"
                location="111"/>
      <template path="dow.xml" included="graph.xml"
                resource="1" key="52" location="113"/>
      <template path="nasdaq.xml" included="graph.xml"
                resource="1" key="53" location="113"/>
    </channel>
  </resourceKeyMap>
</programming>
```

As an example, and without limitation, an XML schema that supports the above XML example can be given by the following XSD definition:

```xml
<?xml version="1.0" encoding="UTF-8"?>
<xs:schema xmlns:xjc="http://java.sun.com/xml/ns/jaxb/xjc"
 xmlns:jxb="http://java.sun.com/xml/ns/jaxb" xmlns:xs="http://www.w3.org/2001/XMLSchema"
 elementFormDefault="qualified" attributeFormDefault="unqualified" jxb:version="1.0"
 jxb:extensionBindingPrefixes="xjc">
  <xs:annotation>
    <xs:appinfo>
      <jxb:globalBindings>
        <xjc:serializable/>
      </jxb:globalBindings>
    </xs:appinfo>
  </xs:annotation>
  <xs:element name="programming">
    <xs:annotation>
```

```
        <xs:documentation>doc root of programming engine output</xs:documentation>
    </xs:annotation>
    <xs:complexType>
        <xs:all>
            <xs:element ref="ruleSetList"/>
            <xs:element ref="actionList"/>
            <xs:element ref="conditionList" minOccurs="0"/>
            <xs:element ref="videoList" minOccurs="0"/>
            <xs:element ref="resourceKeyMap"/>
        </xs:all>
    </xs:complexType>
</xs:element>
<xs:element name="ruleSetList">
    <xs:complexType>
        <xs:sequence maxOccurs="unbounded">
            <xs:element ref="ruleSet"/>
        </xs:sequence>
    </xs:complexType>
</xs:element>
<xs:element name="ruleSet">
    <xs:complexType>
        <xs:sequence maxOccurs="unbounded">
            <xs:element ref="rule"/>
        </xs:sequence>
        <xs:attribute name="location" type="xs:unsignedInt" use="required"/>
        <xs:attribute name="default" type="xs:unsignedInt" use="required"/>
        <xs:attribute name="displayRule" type="displayRuleType" use="required"/>
    </xs:complexType>
</xs:element>
<xs:element name="rule">
    <xs:complexType>
        <xs:sequence>
            <xs:element ref="conditionRef" minOccurs="0" maxOccurs="unbounded"/>
            <xs:element ref="actionRef"/>
        </xs:sequence>
        <xs:attribute name="id" type="xs:unsignedInt" use="required"/>
    </xs:complexType>
</xs:element>
<xs:element name="actionRef">
    <xs:complexType>
        <xs:attribute name="id" type="xs:unsignedInt" use="required"/>
    </xs:complexType>
</xs:element>
<xs:element name="conditionRef">
    <xs:complexType>
        <xs:attribute name="id" type="xs:unsignedInt" use="required"/>
    </xs:complexType>
</xs:element>
<xs:element name="conditionList">
    <xs:complexType>
        <xs:choice maxOccurs="unbounded">
            <xs:element ref="condition"/>
        </xs:choice>
    </xs:complexType>
</xs:element>
<xs:element name="condition">
    <xs:complexType>
        <xs:choice>
            <xs:element ref="or" minOccurs="0"/>
            <xs:element ref="and" minOccurs="0"/>
            <xs:element ref="test" minOccurs="0"/>
            <xs:element ref="data" minOccurs="0"/>
        </xs:choice>
        <xs:attribute name="id" type="xs:unsignedInt"/>
    </xs:complexType>
</xs:element>
<xs:element name="or">
    <xs:complexType>
        <xs:choice maxOccurs="unbounded">
            <xs:element ref="and" minOccurs="0"/>
            <xs:element ref="test" minOccurs="0"/>
            <xs:element ref="data" minOccurs="0"/>
        </xs:choice>
    </xs:complexType>
</xs:element>
<xs:element name="and">
    <xs:complexType>
        <xs:choice maxOccurs="unbounded">
            <xs:element ref="or" minOccurs="0"/>
            <xs:element ref="test" minOccurs="0"/>
```

```
                    -continued

<xs:element ref="data" minOccurs="0"/>
      </xs:choice>
    </xs:complexType>
</xs:element>
<xs:element name="test">
    <xs:complexType>
        <xs:attribute name="lhs" type="paramType" use="required"/>
        <xs:attribute name="rhs" type="xs:string" use="required"/>
        <xs:attribute name="op" type="opType" use="required"/>
    </xs:complexType>
</xs:element>
<xs:element name="data">
    <xs:complexType>
        <xs:attribute name="name" type="xs:string" use="required"/>
        <xs:attribute name="value" type="xs:string" use="required"/>
        <xs:attribute name="op" type="opType" use="required"/>
    </xs:complexType>
</xs:element>
<xs:element name="actionList">
    <xs:complexType>
        <xs:choice maxOccurs="unbounded">
            <xs:element ref="action"/>
        </xs:choice>
    </xs:complexType>
</xs:element>
<xs:element name="action">
    <xs:complexType>
        <xs:choice maxOccurs="unbounded">
            <xs:element ref="image" minOccurs="0"/>
            <xs:element ref="text" minOccurs="0"/>
            <xs:element ref="button" minOccurs="0"/>
            <xs:element ref="hotspot" minOccurs="0"/>
        </xs:choice>
        <xs:attribute name="id" type="xs:unsignedInt" use="required"/>
    </xs:complexType>
</xs:element>
<xs:element name="hotspot">
    <xs:complexType>
        <xs:attribute name="type" type="targetType" use="optional"/>
        <xs:attribute name="onclick" type="xs:string" use="optional"/>
    </xs:complexType>
</xs:element>
<xs:element name="button">
    <xs:complexType>
        <xs:simpleContent>
            <xs:extension base="xs:string">
                <xs:attribute name="type" type="targetType" use="optional"/>
                <xs:attribute name="onclick" type="xs:string" use="optional"/>
            </xs:extension>
        </xs:simpleContent>
    </xs:complexType>
</xs:element>
<xs:element name="image">
    <xs:complexType>
        <xs:choice minOccurs="0" maxOccurs="unbounded">
            <xs:element ref="pframe" minOccurs="0"/>
        </xs:choice>
        <xs:attribute name="src" type="xs:string" use="required"/>
        <xs:attribute name="type" type="imageType" use="required"/>
    </xs:complexType>
</xs:element>
<xs:element name="text" type="xs:string"/>
<xs:element name="pframe">
    <xs:complexType>
        <xs:attribute name="pid" type="xs:string" use="optional"/>
        <xs:attribute name="key" type="xs:unsignedInt" use="required"/>
        <xs:attribute name="x" type="xs:unsignedShort" use="required"/>
        <xs:attribute name="y" type="xs:unsignedShort" use="required"/>
    </xs:complexType>
</xs:element>
<xs:element name="videoList">
    <xs:complexType>
        <xs:choice maxOccurs="unbounded">
            <xs:element ref="video"/>
        </xs:choice>
    </xs:complexType>
</xs:element>
<xs:element name="video">
    <xs:complexType>
        <xs:all>
```

```
            <xs:element ref="title"/>
            <xs:element ref="providerId"/>
            <xs:element ref="adiAssetId"/>
        </xs:all>
        <xs:attribute name="number" type="xs:unsignedByte" use="required"/>
    </xs:complexType>
</xs:element>
<xs:element name="title" type="xs:string"/>
<xs:element name="providerId" type="xs:string"/>
<xs:element name="adiAssetId" type="xs:string"/>
<xs:element name="resourceKeyMap">
    <xs:complexType>
        <xs:choice maxOccurs="unbounded">
            <xs:element ref="channel"/>
        </xs:choice>
    </xs:complexType>
</xs:element>
<xs:element name="channel">
    <xs:complexType>
        <xs:choice maxOccurs="unbounded">
            <xs:element ref="template"/>
        </xs:choice>
        <xs:attribute name="name" type="xs:string" use="required"/>
    </xs:complexType>
</xs:element>
<xs:element name="template">
    <xs:complexType>
        <xs:attribute name="path" type="xs:string" use="required"/>
        <xs:attribute name="included" type="xs:string" use="optional"/>
        <xs:attribute name="resource" type="xs:unsignedByte" use="required"/>
        <xs:attribute name="key" type="xs:unsignedInt" use="required"/>
        <xs:attribute name="location" type="xs:unsignedInt" use="required"/>
    </xs:complexType>
</xs:element>
<xs:simpleType name="opType">
    <xs:restriction base="xs:NMTOKEN">
        <xs:enumeration value="eq"/>
        <xs:enumeration value="ne"/>
        <xs:enumeration value="lt"/>
        <xs:enumeration value="le"/>
        <xs:enumeration value="gt"/>
        <xs:enumeration value="ge"/>
    </xs:restriction>
</xs:simpleType>
<xs:simpleType name="targetType">
    <xs:restriction base="xs:NMTOKEN">
        <xs:enumeration value="channel"/>
        <xs:enumeration value="url"/>
        <xs:enumeration value="vod"/>
    </xs:restriction>
</xs:simpleType>
<xs:simpleType name="imageType">
    <xs:restriction base="xs:NMTOKEN">
        <xs:enumeration value="bitmap"/>
        <xs:enumeration value="pframe"/>
    </xs:restriction>
</xs:simpleType>
<xs:simpleType name="paramType">
    <xs:restriction base="xs:NMTOKEN">
        <xs:enumeration value="system.time"/>
        <xs:enumeration value="channel.name"/>
        <xs:enumeration value="channel.network"/>
        <xs:enumeration value="channel.category"/>
        <xs:enumeration value="hmenu.category"/>
        <xs:enumeration value="vmenu.category"/>
        <xs:enumeration value="category.content"/>
        <xs:enumeration value="program.name"/>
        <xs:enumeration value="program.genre"/>
        <xs:enumeration value="program.length"/>
        <xs:enumeration value="subscriber.age"/>
        <xs:enumeration value="subscriber.gender"/>
        <xs:enumeration value="subscriber.zipcode"/>
        <xs:enumeration value="subscription.tier"/>
        <xs:enumeration value="favorites.channel"/>
        <xs:enumeration value="favorites.network"/>
        <xs:enumeration value="favorites.genre"/>
        <xs:enumeration value="favorites.content"/>
        <xs:enumeration value="last.channel"/>
        <xs:enumeration value="last.network"/>
        <xs:enumeration value="last.content"/>
```

```
        <xs:enumeration value="last.genre"/>
      </xs:restriction>
    </xs:simpleType>
    <xs:simpleType name="displayRuleType">
      <xs:restriction base="xs:NMTOKEN">
        <xs:enumeration value="random"/>
        <xs:enumeration value="sequential"/>
        <xs:enumeration value="weighted"/>
        <xs:enumeration value="firstFound"/>
      </xs:restriction>
    </xs:simpleType>
</xs:schema>
```

Programmable Conditions

The business rules that describe the programmable conditions for the placement of content along multiple dimensions, include sets of content programming rules that support the creation of user interfaces that permit (without limitation) the following:

a Time-shifted user interfaces that present different content selections to viewers based on time of day. Preferred placement selection can be conjunctive to time-of-day content selection.
 b User interfaces wherein the viewer is presented different content selections based on the current broadcast content, to enhance the current broadcast and extend the content bandwidth. Preferred placement selection can be conjunctive to current broadcast dependent content selection.
 c Tiled user interfaces wherein business rules can be specified to dynamically control content of each tile and/or dynamically control placement of each tile (preferred placement).
 d Tiled user interfaces wherein the screen can be divided dynamically into different groupings of tiles, where the tiles have different sizes. Preferred placement selection can be conjunctive to content size and type.
 e Tiled user interfaces consisting of groupings of grids of tiles wherein each grouping may be further sub-divided into more granular groupings of smaller tiles, based on navigation flow and business rules. These groupings may be individually scrollable using a remote control device.
 f Tiled user interfaces wherein the transition between different tiled groupings on the screen can be dynamically controlled. Preferred placement selection can be conjunctive to positioning before or after such transition between groupings.
 g Tiled user interfaces wherein the number of tiles in each screen grouping can be dynamically controlled. Preferred placement selection can be a factor in dynamically controlling the number of tiles in a grouping.
 h Tiled user interfaces wherein the tiled screen groupings can be configured at a prior time and dynamically selected using business rules, including preferred placement rules.

Promotions, up-sells, advertising, customer care and other content programming can be controlled by the MSO and/or MSO-designated networks and programmers. The programming of content can be conditioned by various dynamically executed business rules conditioned by parameters exemplified, without limitation, by the XML examples above:

a Current Application and application type.
 b Location.
 c Time-of-day and Day part.
 d Current channel.
 e Current network family.
 f Current channel category.
 g Current Program (TV or VOD).
 h Current Program genre.
 i Current Program attributes.
 j Current Content type.
 k Application data.

Programming business rules can also be defined to target subscriber profile attributes such as:

a Demographic.
 b Service tier.
 c Geographic (e.g., based on postal code).
 d Saved subscriber and set-top behavior and previous actions.

Turning now to user interfaces that illustrate aspects of the present invention, FIGS. 3-15 present examples of preferred placement within various user interface screens, which, without limitation, demonstrate implementations of the placement of content along multiple dimensions as described above. Taking each illustration in turn, FIGS. 3 and 4 illustrate an embodiment of the above-described features for preferred placement within a user interface and navigation scheme that provides for:

1 Dividing the screen into a grid of thirds;
 2 Dynamically dividing each third into further sub-groupings which are themselves grids of tiles (the content of each tile can be dynamically controlled based on business rules); and
 3 Allowing each grouping or grid of tiles to be individually scrolled or a tile therein selected using a remote control or other user input device.

Figure 3:
FIGS. 3-15 illustrate examples of user interface screens configured in accordance with various embodiments of the present invention.

FIG. 3 illustrates a user interface screen 32 showing an example of a top level grid called "Entertainment". FIG. 4 illustrates a user interface screen 34 showing an example of navigation to a next-level detail grid within the Entertainment section.

Figure 4:

Collectively, FIGS. 3 and 4 illustrate the placement of content 'above the fold' so that an application operator can dynamically place certain content tiles on the first application screen seen by the viewer. Subsequent content tiles are available via a navigation (e.g., scrolling or paging the tiles) to a second and subsequent screen(s) of content tiles.

Figure 5:

In the embodiment shown in FIG. 5, the viewer is presented a user interface screen 36 that includes a combination of broadcast and on-demand content selections. Such a user interface makes available a vast library of on-demand content, combining broadcast and on-demand in an intuitive way. FIG. 5 shows an interactive program guide with the on-demand content mixed into the listings every N number of listings, N being configurable to the application system.

FIG. 5 illustrates two mechanisms of preferred placement at work. On the left side of user interface 36 is shown a list of on-demand categories. This list of categories is subject to preferred placement business rules, for example, sequential placement rules for each category based on time-of-day and/or category priority. Furthermore, the viewer may be provided with an interface to update the prioritization of such content selections. In addition, content tiles for specific on-demand programming are provided. This list of content tiles is also subject to preferred placement business rules, such as by way of illustration only, sequential placement rules based on brand (e.g., Disney), specific show (e.g., Sopranos), etc., in a manner that changes dynamically based on, for example, time-of-day and/or user profile and behavior data, etc.

Figure 6:
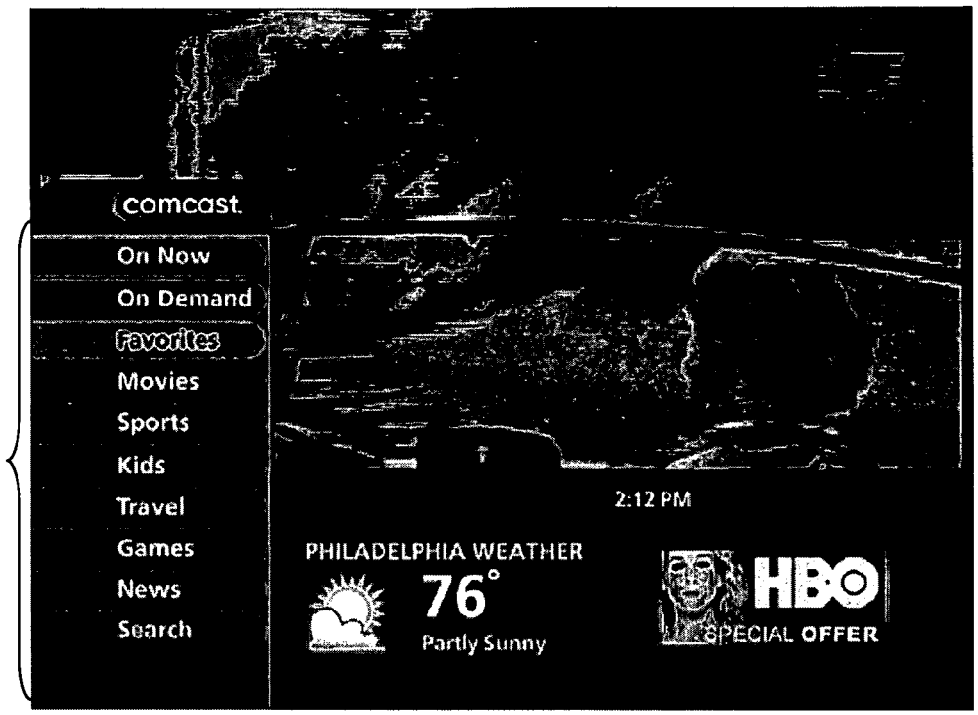

FIG. 6 illustrates a user interface screen 38 that includes an example of a Main Menu application 40, which is an overlay over the current video display (whether broadcast TV or on-demand content) that enables navigation to all other iTV services. A viewer may access the main menu 40 by pressing an appropriate button on a remote control. This main menu 40 provides key advertising space by virtue of being one of the top iTV screens. In this example, the preferred placement of content extends to the types and content of the tiles along the bottom horizontal surface 42 of the L-shaped window occupied by the main menu application. Furthermore, in this example, the list of selectable categories and applications in the menu list is programmable, including the selection and sequence of content items.

In some cases special offers may be shown only to viewers who do not presently have access to the featured service. Multiple promotions may be targeted to a given location and selected according to an MSO-controlled rule. Programming campaigns for overlay applications such as the main menu 40 may be broadcast out-of-band using trickle feed and updated dynamically by the application client. Overlay application campaigns may also be broadcast in-band in special cases as described below.

Category Applications

Figure 7:
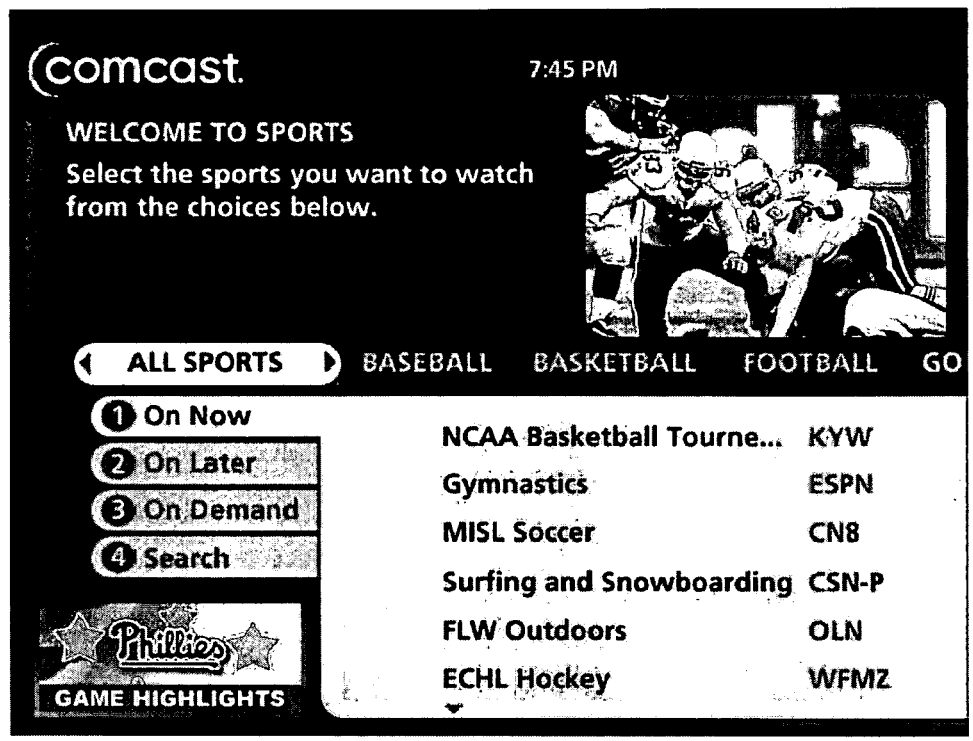
Figure 8:
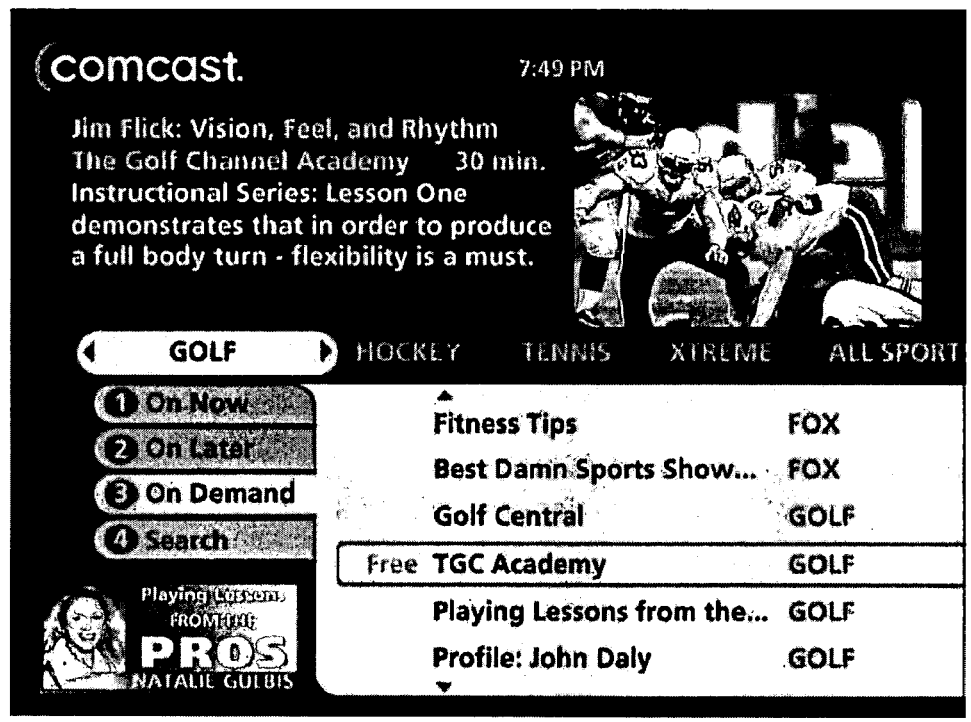
Figure 9:
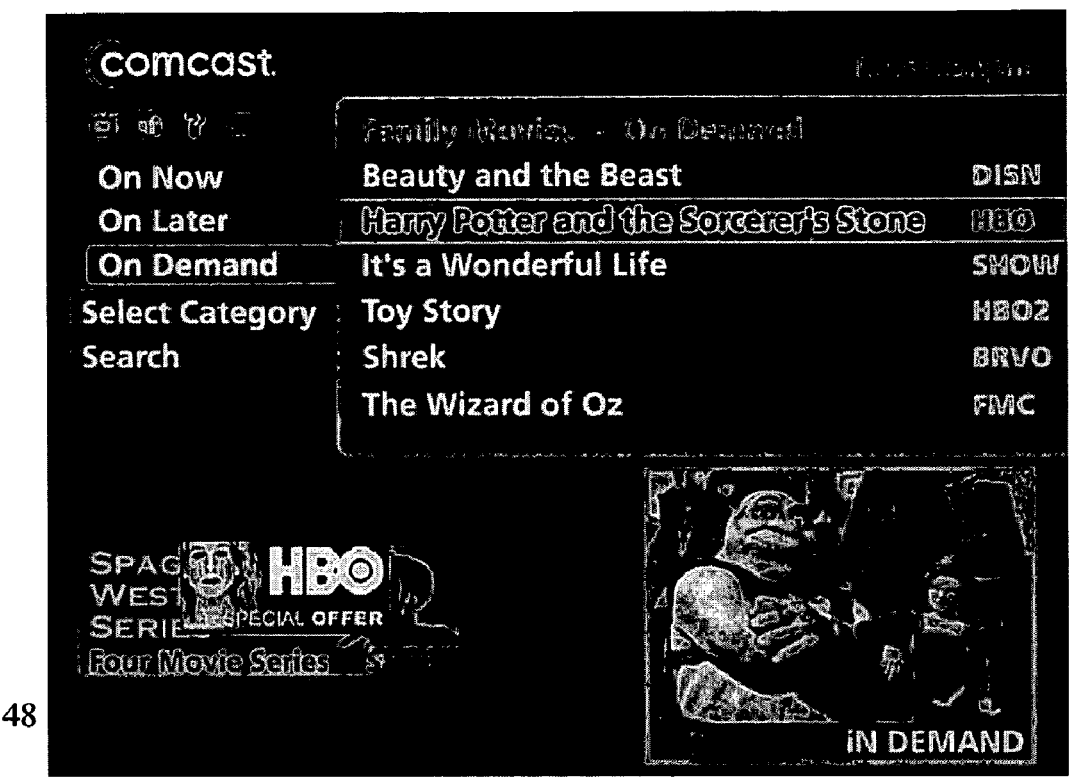

FIGS. 7-9 illustrate a type of iTV application called category applications, which can extend across many themes (such as Sports, Movies, Kids, Travel, History, Entertainment, Home, Parenting, etc.). These applications are branded by an MSO and provide a general navigation interface to all programming in their respective categories, blending linear broadcast programming with on-demand programming and other news, trivia, tickers and other information content relevant to that category. The MSO can deploy category applications as part of a core iTV navigation service. By using the programming engine, category applications can be monetized in a uniform manner by the programming of ad tiles, video ads, broadcast channel sponsorships, and on-demand listings.

FIGS. 7 and 8 illustrate user interface screens 44 and 46 associated with an example of a Sports Category Application that allows the viewer to navigate through available sports programming and by individual sport, for both linear and on-demand programming. Some of the key opportunities to monetize this application through advertising and promotions include ad tiles, video sponsorship and preferred placement. For example, advertisement tile space can be designed into the Sports Application, as shown in the lower left of user interface 44 of FIG. 7 and user interface 46 of FIG. 8. As in other contexts, ad tiles can be programmed by application, location, time-of-day or day part, current channel, channel family, current program, etc. Ad tile programming can also be targeted by subscriber profile attributes such as demographic, service tier, zip code etc.

Video sponsorship opportunities also exist and videos may be displayed in appropriate inset windows as illustrated in these examples. For example, a broadcaster or network operator may sponsor the Sports Application by paying for a video inset that is dynamically scaled on the server and broadcast alongside the Sports Application data carousel in the same 6 MHz channel. In general, iTV applications that overlay full screen or inset video can read data and programming campaigns from the in-band carousel without having to 'tune-away' only if the the video channel is broadcast in the same 6-Mhz channel as the data carousel. This supports video sponsorship opportunities such the ones described herein as well as MSO barker channels.

In addition, on-demand programming can be listed according to a priority that includes 'pay-for-placement'. Content providers can pay to be listed higher in sequence thereby being the first titles that the viewer sees. FIG. 9 illustrates, by way of analogy, a user interface screen 48 showing a Movies Category Application that provides the viewer with movies listings across linear and on-demand programming, and that is navigable by category and genre. This application provides the same kinds of advertising opportunities for monetizing the core iTV services, including ad tiles, video spots and preferred placement. The video spots may be run as a continuous ad loop that is programmed, pre-produced and broadcast into the 6 MHz channel containing the application data carousel. The ad loop can be replaced at MSO-controlled intervals using the programming manager.

Channel Hat

Figure 10:
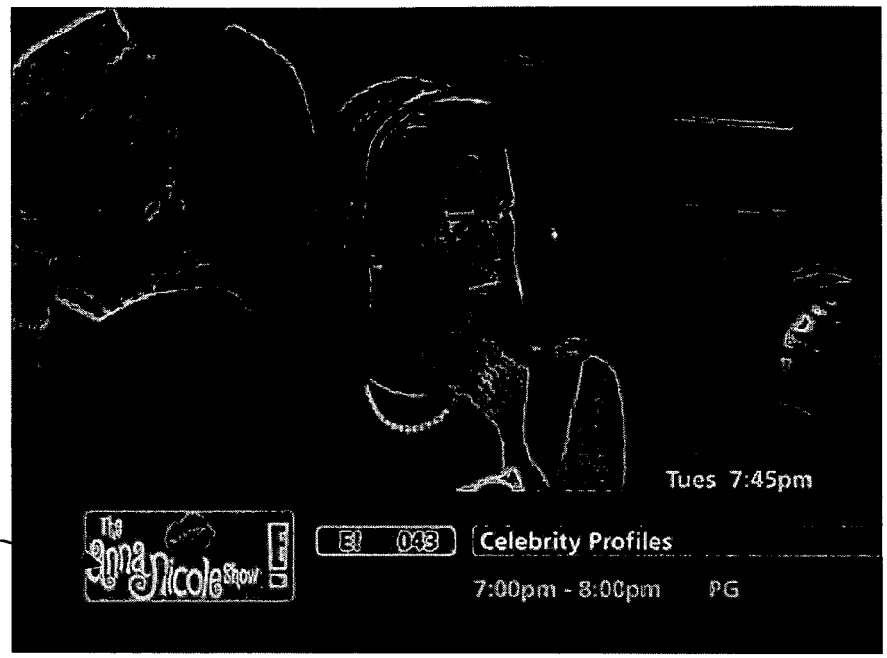

FIG. 10 illustrates a user interface screen 50 that includes a channel hat application 52 that provides channel and program information in overlay over video. Programming opportunities for ad tiles and programmer links can be provided in this type of application. For example, ad tiles may be dynamically sensitive to the channel information being displayed in the channel hat (as in this example, an ad for the Anna Nicole show is displayed when the E! channel is displayed). These tiles are also programmable along the dimensions previously discussed and can link to broadcast, on-demand video or interactive applications. The MSO can also provide a programmer with a link to a programmer application or mini-guide as described below. Both the link as well as the programmer application may be monetizable opportunities.

Network Application/Mini-Guides

Figure 11:
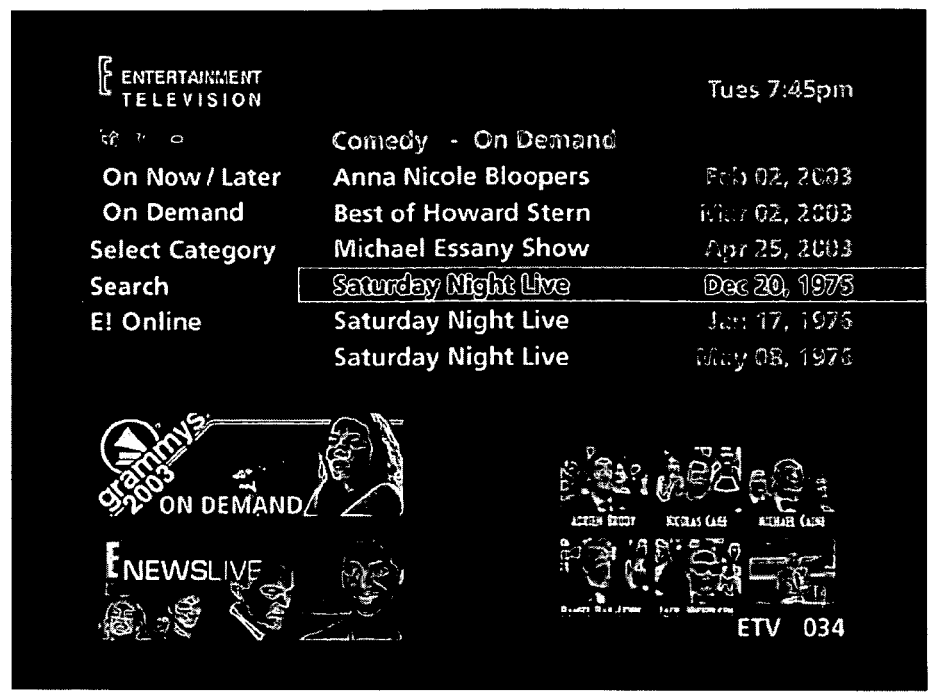

FIG. 11 illustrates an example of a user interface screen 54 by which an MSO can make network 'virtual channels' available to viewers in addition to the core iTV content navigation service. These are content areas that focus on network-branded content such as an E! Entertainmen™ application or an ESPN™ Sports application. Whereas in the previous examples, an MSO managed the advertising and promotional space in the core iTV navigation application, with programmer applications it is the network that manages much of the advertising space. Nevertheless, the same programming manager provides the programming campaign management interfaces and allows the MSO to control and moderate all iTV advertising and programming functions to provide a unified service to the viewer.

The MSO can provide (paid) access to the network application in four ways: from the channel information bar associated with that channel; from the channel indicator in any On Now, On Later or Guide listing; from the channel indicator in the On Demand interface; and from promotional tiles advertising E!™ in others areas of the iTV service. The present example contains a pre-produced scaled video stream (VOD) blended with a full frame I-frame or motion background and listings for programs available on now, on later, and on demand as well as other content and promotions. By way of example, an E! application might provide the viewer with navigation to all On Now, On Later and On Demand programming from E! The subscriber can filter content by network-defined category selections and metadata.

Two content/promotions campaigns are also shown in the example illustrated in FIG. 11. Promotions will usually be programmer-defined and can include available on-demand content, On Now programming and managed content links. Programming selections will ideally be conditioned by the category selections in view and campaign elements will thus appear dependent on application data as well.

Pre-produced scaled video can be broadcast as one of the category video feeds, in which case the programmer channel would be carried on the same 6 Mhz channel as the data carousel and thus have access to the carousel. Alternatively, the pre-produced programmer application video can be broadcast on another channel, which would be tuned after the programmer application data is loaded.

Microsites

Similar to the network/programmer applications above, but on a smaller scale, microsites are advertiser and local content provider destinations consisting of a few (e.g., one to three) pages of content. Under the MSO's control, promotions and ad tiles may be sprinkled throughout the iTV service leading viewers to these advertising destinations, in addition to access from menu listings in the 'advertisers' content area of the core iTV service.

"Shelf Space" Business Example

"Shelf space" describes how the MSO iTV application model can support business drivers, such as pay-for-placement, in order to monetize the core iTV navigation service as well as other iTV applications to sustain a free VOD model with advertising dollars. The following table 1 summarizes certain premium shelf space advertising elements and the application types that support each one.

TABLE 1

| Premium Shelf Space | Applications |
|---|---|
| Ad Tiles | All (Main Menu, MSO Home, Guide, Channel Hat, Movies On-Demand, Sports, Entertainment, Other Category Apps, Programmer Apps/Mini-guides, Settings, Parental Control, etc.) |
| Scaled video | Movies, Sports, Entertainment, Category Apps, Programmer Apps/Mini-guides |
| List placement | Movies, Sports, Entertainment, Category Apps, Programmer Apps/Mini-guides, Search |
| Top Picks | Movies, Sports, Entertainment, Category Apps, Programmer Apps/Mini-guides, Search, Main Menu |

Several examples are provided to illustrate scenarios for managing shelf space within iTV applications.

Figure 12:

FIG. 12 illustrates a user interface screen 56 that provides an alternative treatment to illustrate the On-Demand category, 'Featured Today', which provides for the placement of a video promotion using the preferred placement business rules described herein. It demonstrates the programmable selection of featured previews, changing at scheduled intervals. Multiple video preview promotions may be presented in a sequence to the viewer, with the video lists being swapped out at each programming campaign update. The viewer may choose to view the program in its entirety at any time, for example by clicking on a hotspot that is navigable in the interface. Furthermore, user interface screen 56 demonstrates the addition of content tile groupings that promote different types of content (in this case a broadcast show and an on-demand title), the specific content being dynamically selectable according to the programming and selection rules described above.

Figure 13:
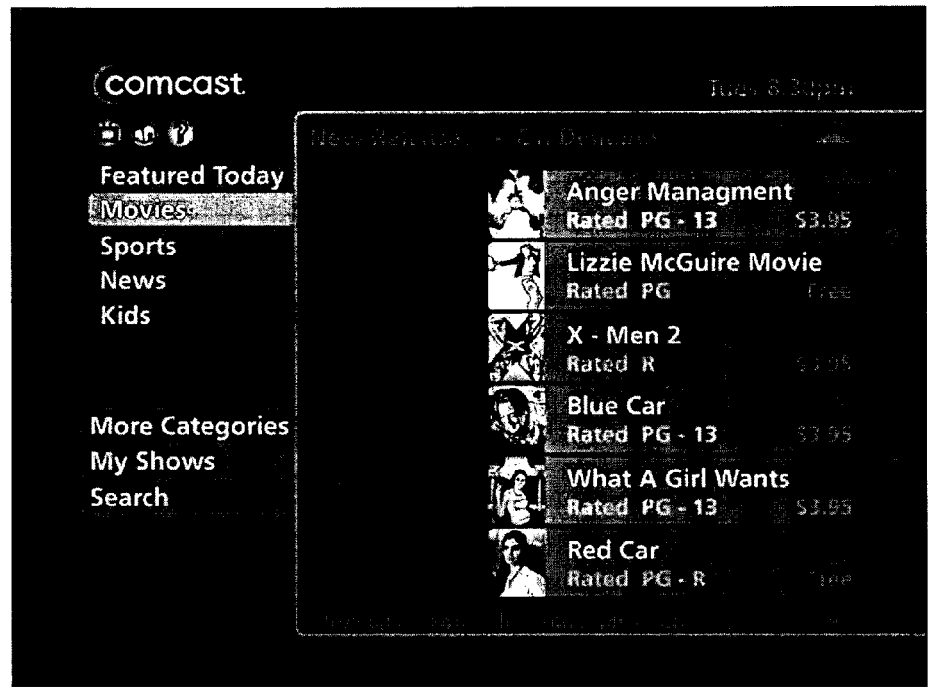
Figure 14:
Figure 15:
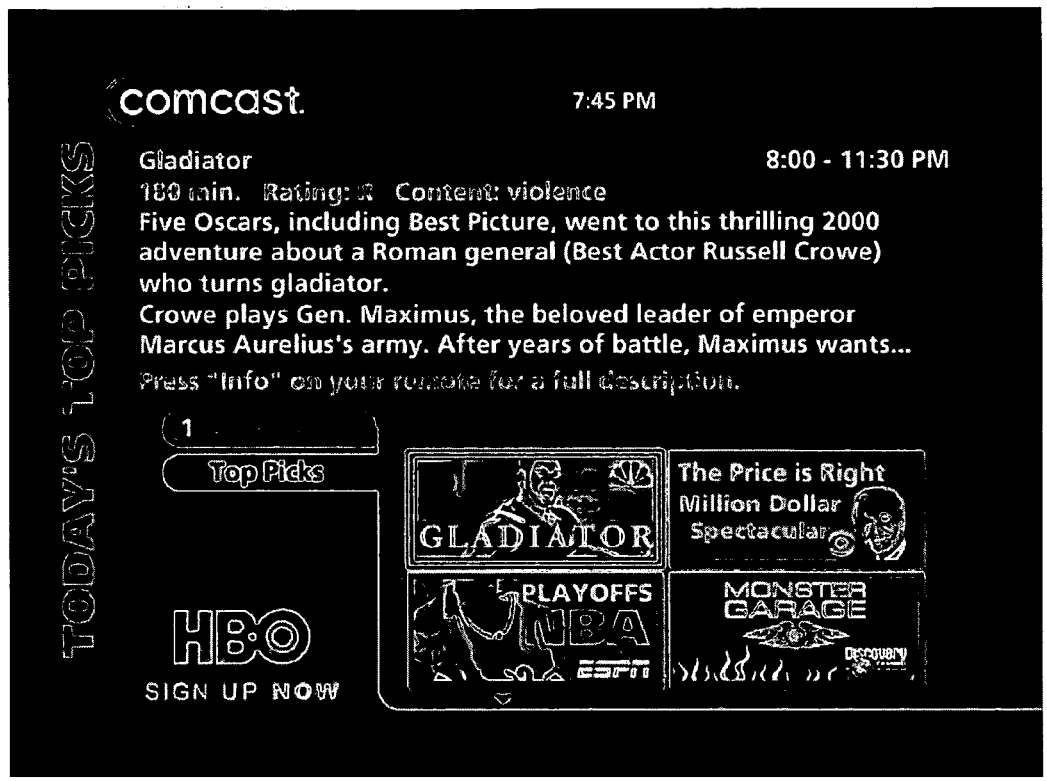

FIGS. 13-15 similarly illustrate linear and on-demand content interfaces 58, 60 and 62, respectively, that provide examples of the dynamic preferred placement of content with above- and below-the-fold placement, placement of listings and tiles high in the sequence (e.g., to the top of the list) based on preferred placement rules. FIGS. 13 and 14 illustrate an example of network preferred placement with on-demand titles from HBO, Starz, Sundance placed above the fold. In FIG. 14 the preferred provider tiles are intermixed with generic category tiles. FIG. 15 illustrates and example of an MOD Top Picks Placement, demonstrating preferred placement of 'Top Picks'.

Collectively, all of the preferred placement concepts demonstrated herein and as illustrated in FIGS. 3 to 15 incorporate 'shelf space' assets that can be programmed as described in the programmable conditions section above, and in general consist of ad tiles, scaled video, list placement and top picks:

a Ad Tiles—Programmers and advertisers can pay for the placement of promotions/ads in specific WCDUI applications (e.g., Main Menu, Sports, Movies On-Demand) based on a combination of programming conditions such as day part, IPG schedule, content category, service tier, channel/channel family, zip code, etc. Promotions can link to a VOD asset, to an interactive site (such as a specialty site, or a programmer application or a mini-guide), to current programming in the case of a TV program promotion, or to the Reminders or PVR Application in the case of On Later programming.

b Scaled video—Scaled video windows can support the programming of video clips on specific WCDUI applications (e.g., Sports, Movies On-Demand, Category Applications) based on multiple programming conditions such as day part, IPG schedule, content category, etc. These video clips, ads or previews may be user selectable, leading the viewer to a purchase screen for the promoted asset, to the Reminders or PVR App for the show, or to an advertiser iTV site.

c List placement—The present application system can support programming of premium placement of VOD listings for the various WCDUI applications such as Movies, Sports, Entertainment and other Category Applications. This support may depend on an enhanced interface to the client database so that the MAS programming engine can write a placement priority flag to the VOD listings database for selection during client database query execution.

d Top Picks—A Top Picks tab can be added to applicable WCDUI applications such as Movies, Sports, Entertainment and other Category Applications. These WCDUI application avails are made available through the programming manager. Programmers pay for priority placement of content into this space.

Programming Manager

A programming manager associated with the application server may enable the MSO to manage and control all of the advertising opportunities described above in a uniform manner across all iTV applications deployed with the present application system across markets, platforms and middleware. The programming manager provides an administrative interface to create and manage programming campaigns. Using the programming manager, the MSO can specify and organize the business rules that target programmable content to subscribers, across disparate iTV applications distributed to multiple markets. The programming engine executes these programming campaigns and server rules, generates programmable content and client business rules, and thus automates the flow of programmable content into enabled applications. The present application system will also integrate with the MSO web application interfaces to retrieve service tiers and franchise rate codes to enable targeting content based on subscriber profile information.

As used here, the term 'programming' refers to the ability to dynamically control the promotions, advertising, video and other types of content that appear across all interactive services in a unified manner, as well as to control the manner and deployment of the application services themselves. The programming manager may include web-based interfaces for the MSO, and MSO-approved content partners to dynamically control and schedule these promotions, advertising, video and other types of content in a uniform manner based on relevance and other business rules. It provides customized management interfaces for specific functions such as managing application and programming asset inventory and for defining promotional, up-sell and ad campaigns. VOD asset metadata, program listings and managed content metadata are made available to programming interfaces via browsers and query engines.

As used herein, the terms "computer method," "computer program", "routine," and "subroutine" are substantially synonymous, with "computer method" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

It should be appreciated that some portions of the detailed description above were presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the present invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

Thus, methods and systems for providing preferred placement of programming content within an iTV system have been described. Although the present invention has been discussed with reference to several illustrated embodiments thereof, these were meant to serve as examples only and the true scope of the invention should only be measured in terms of the following claims.

What is claimed is:

1. A method, comprising
   determining a relative placement priority of each programmable content element, with respect to other programmable content elements, in a set of programmable content elements for placement within an interactive television (iTV) application based on one or more of a plurality of business rules that describe placement criteria of the programmable content elements including at least one pay-for-placement criterion, wherein each of the programmable content elements is identified by a resource key attribute that references an associated programming campaign, said programming campaign including a campaign key that uniquely identifies the programming campaign, a listing of candidate content elements, and a display rule for selecting one content element among the candidate content elements;

organizing the placement of each programmable content element in a plurality of placement locations relative to placement of the other programmable content elements in other ones of the plurality of placement locations within the iTV application based on the relative placement priority; and displaying the organized set of programmable content elements to a viewer.

2. An interactive television (iTV) system, comprising:

a server including one or more server processors and server memory storing machine readable server instructions that when executed by the one or more server processors cause the server to:

determine a relative placement priority of each programmable content element, with respect to other programmable content elements, in a set of programmable content elements for placement within an iTV application based on one or more of a plurality of business rules that describe placement criteria of the programmable content elements, wherein each of the programmable content elements is identified by a resource key attribute that references an associated programming campaign. said programming campaign including a campaign key that uniquely identifies the programming campaign, a listing of candidate content elements, and a display rule for selecting one content element among the candidate content elements; and organize the placement of each programmable content element in one of a plurality of placement locations relative to placement of the other programmable content elements in other ones of the plurality of placement locations within the iTV application based on the placement priority; and a client including one or more client processors and client memory storing machine readable client instructions that when executed by the one or more client processors cause the client to:

receive the organized set of programmable content elements from the server via a content distribution network, and cause the organized set of programmable content elements to be displayed to a viewer.

3. The system of claim 2 wherein the organized set of programmable content elements within the iTV application include advertising, promotional opportunities, video, images and text displayed within user interfaces accessible by the viewer through the client.

4. The system of claim 2, wherein the machine readable server instructions, when executed by the one or more server processors, further cause the server to select each programmable content elements according to its associated programming campaign.

5. The system of claim 2 wherein the business rules depend on one or more of: location, current channel, current channel family, current channel category, time-of-day, offering category, current program, current program genre, current application, current content type, and subscriber profile.

6. The system of claim 2 wherein iTV application includes the plurality of placement locations positioned in a sequence, and the placement priority determines a relative order of programmable content elements within the sequence.

7. The system of claim 2 wherein the business rules define placement of the programmable content elements in the placement locations within the iTV application based on one or more of the following criteria: time of day, current channel, current broadcast content, viewer demographic, viewer behavior, navigation context, and current content category.

8. The system of claim 7 wherein the business rules comprise rules associated with one or more of the following categories: advertising and promotional rules; TV channel association rules; timing rules for rotation of content, ads, and promotions; category placement rules; VOD metadata rules; and self provisioning rules.

9. A method comprising:

receiving business rules that describe programmable conditions for placement of content made up of a collection of elements within an interactive television (iTV) application along multiple dimensions, wherein each element is identified by a resource key attribute that references an associated programming campaign, said programming campaign including a campaign key that uniquely identifies the programming campaign, a listing of candidate elements, and a display rule for selecting one element from among the listing of candidate elements, wherein the business rules support creation of a user interface with defined locations within which each of the elements may be displayed, and wherein the business rules prioritize placement of each of the elements at one of the defined locations relative to the placement of other elements at other ones of the defined locations;

evaluating with a computer processor the business rules to place one or more of the elements at the defined locations within the user interface; and storing to a computer readable memory the user interface having the one or more elements placed at the defined locations.

10. The method of claim 9 wherein the business rules comprise rules adapted to control placement of tiles within tiled user interfaces; rules adapted to permit groupings of the tiles within the tiled user interfaces; and rules adapted to permit dynamically controlled transitions between the groupings of the tiles within the tiled user interfaces.

11. The method of claim 9 wherein the evaluating of the business rules is conditioned by parameters including one or more of: current application, application type, location, time-of-day, day part, current channel, current network family, current channel category, current program, current program genre, current program attributes, current content type, and application data.

12. The method of claim 9 wherein the business rules are conditioned on subscriber profile attributes including one or more of: demographics, service tier, geography, and subscriber behavior.

13. The method of claim 9, wherein the business rules prioritize the placement of each of the elements according to placement criteria of the content including pay-for-placement criteria.

14. The method of claim 9, wherein the defined locations within the user interface include ad tiles.

15. The method of claim 9, wherein the placement of content made up of the collection of elements within an interactive television (iTV) application along multiple dimensions includes tune shifting so as to present different elements within the defined locations based on a time of day.

16. The method of claim 13, wherein the placement criteria include one or more of: brand, content owner, application location, current channel, current channel family, current channel category, time of day, content category, current program, current program genre, current iTV application, current content type, and subscriber and set-top box profile and behavior data.

17. A method, comprising
determining a relative placement priority of each programmable content element, with respect to other programmable content elements, in a set of programmable content elements for placement within an interactive television (iTV) application based on one or more of a plurality of business rules that describe placement criteria of the programmable content elements, wherein each of the programmable content elements is identified by a resource key attribute that references an associated programming campaign, said programming campaign including a campaign key that uniquely identifies the programming campaign, a listing of candidate content elements, and a display rule for selecting one content element among the candidate content elements;
organizing the placement of each programmable content element in a plurality of placement locations relative to placement of the other programmable content elements in other ones of the plurality of placement locations within the iTV application based on the relative placement priority; and
causing the organized set of programmable content elements to be displayed on a display device.

18. The method of claim 17 wherein the business rules include rules for placing one or more of: product offerings, promotions, advertising campaigns, video on demand (VOD) listings, broadcast-on-demand listings, and transactional opportunities, across disparate iTV services.

19. The method of claim 17 wherein the business rules are configured to accommodate subscriber specific rules according to a subscriber profile associated with a particular client device.

20. The method of claim 17, wherein the business rules are dynamically executable at a time of execution of the iTV application and at the time of creation of the iTV application.

21. The method of claim 17 wherein the placement criteria include one or more of: brand, content owner, application location, current channel, current channel family, current channel category, time of day, content category, current program, current program genre, current iTV application, current content type, subscriber and set-top box profile, and behavior data.

22. The method of claim 17 wherein the iTV application is accessible via a user interface including one or more groups of programmable opportunities.

23. The method of claim 17, further including selecting each programmable content element according to its associated programming campaign.

24. The method of claim 18 wherein the rules for placing one or more product offerings depend on one or more selection criteria including one or more of: location, current channel, current channel family, current channel category, time of day, offering category, current program, current program genre, current iTV application, current content type, and subscriber profile.

25. The method of claim 22 wherein each programmable opportunity comprises one or more of the placement locations simultaneously displayed within the iTV application where content may be placed.

26. The method of claim 25 wherein the content includes one or more of: advertisements, promotions, data including text, images, links to other applications, and video content.

* * * * *

UNITED STATES PATENT AND TRADEMARK OFFICE
CERTIFICATE OF CORRECTION

| | | |
|---|---|---|
| PATENT NO. | : 8,220,018 B2 | Page 1 of 1 |
| APPLICATION NO. | : 10/933845 | |
| DATED | : July 10, 2012 | |
| INVENTOR(S) | : De Andrade et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,903 days.

Signed and Sealed this
Eleventh Day of December, 2012

David J. Kappos
*Director of the United States Patent and Trademark Office*